(12) United States Patent
Shank et al.

(10) Patent No.: US 11,221,506 B2
(45) Date of Patent: Jan. 11, 2022

(54) POLARIZATION SWITCHES INCLUDING A PHASE CHANGE MATERIAL

(71) Applicant: GLOBALFOUNDRIES U.S. Inc., Santa Clara, CA (US)

(72) Inventors: Steven M. Shank, Jericho, VT (US); Yusheng Bian, Ballston Lake, NY (US); Ajey Poovannummoottil Jacob, Watervliet, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 48 days.

(21) Appl. No.: 16/799,100

(22) Filed: Feb. 24, 2020

(65) Prior Publication Data
US 2021/0263348 A1    Aug. 26, 2021

(51) Int. Cl.
*G02F 1/01*     (2006.01)
*G02F 1/035*   (2006.01)

(52) U.S. Cl.
CPC .......... *G02F 1/0147* (2013.01); *G02F 1/0136* (2013.01); *G02F 1/035* (2013.01); *G02F 1/0144* (2021.01); *G02F 2201/066* (2013.01); *G02F 2203/50* (2013.01)

(58) Field of Classification Search
CPC .............. G02B 6/126; G02B 6/125; G02B 2006/12145; G02F 1/035; G02F 2201/066; G02F 2203/50
See application file for complete search history.

(56) References Cited

U.S. PATENT DOCUMENTS

| | | | | |
|---|---|---|---|---|
| 2015/0110441 A1* | 4/2015 | Heideman | ............. | G02F 1/0136 385/14 |
| 2017/0315387 A1* | 11/2017 | Watts | .................. | G02B 6/29331 |
| 2019/0331941 A1* | 10/2019 | Coolbaugh | ............. | G02F 1/095 |
| 2019/0339585 A1* | 11/2019 | Heck | ...................... | G02F 1/295 |

OTHER PUBLICATIONS

Giewont et al., "300-mm Monolithic Silicon Photonics Foundry Technology" IEEE Journal of Selected Topics in Quantum Electronics, vol. 25, No. 5, Sep./Oct. 2019.
Sánchez et al., "Experimental demonstration of a tunable transverse electric pass polarizer based on hybrid VO2/silicon technology", Aug. 1, 2018, Optics Letters, vol. 43, No. 15.
Xu et al., "Ultra-Compact Active TE and TM Pass Polarizers Based on Ge2Sb2Te5 in Silicon Waveguide", IEEE Photonics Technology Letters, vol. 28, No. 23, Dec. 1, 2016.
Sánchez et al., "Ultra-compact TE and TM pass polarizers based on vanadium dioxide on silicon" Optics Letters, vol. 40, No. 7, Apr. 1, 2015.

(Continued)

*Primary Examiner* — Ryan A Lepisto
*Assistant Examiner* — Erin D Chiem
(74) *Attorney, Agent, or Firm* — Thompson Hine LLP; Anthony Canale

(57) ABSTRACT

Structures for a polarization switch and methods of fabricating a structure for a polarization switch. A waveguide core is located on a substrate. The waveguide core is composed of silicon nitride. An active layer is positioned proximate to a section of the waveguide core. The active layer composed of a phase change material having a first state with a first refractive index and a second state with a second refractive index.

21 Claims, 3 Drawing Sheets

(56) References Cited

OTHER PUBLICATIONS

Bian et al., "Hybrid vanadate waveguiding configurations for extreme optical confinement and efficient polarization management in the near-infrared", Nanoscale, Issue 35, 2018.
Miller et al., "Silicon waveguide optical switch with embedded phase change material", vol. 25, No. 22, Oct. 30, 2017, Optics Express.
Briggs et al., "Compact silicon photonic waveguide modulator based on the vanadium dioxide metal-insulator phase transition", © 2010 Optical Society of America.

\* cited by examiner

POLARIZATION SWITCHES INCLUDING A PHASE CHANGE MATERIAL

BACKGROUND

The present invention relates to photonics chips and, more specifically, to structures for a polarization switch and methods of fabricating a structure for a polarization switch.

Photonics chips are used in many applications and systems, such as data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components.

An electro-optic modulator can be used as an optical switch to selectively route an arriving optical signal from an input to a destination output without converting the optical signal to an electrical signal. In addition, through the modulation, the selective routing can be utilized to convert a continuous optical signal into an encoded data stream. One type of optical switch is a Mach-Zehnder interferometer (MZI) modulator. A disadvantage of this type of switching is that MZI modulators exhibit a weak electro-optic effect. For that reason, MZI modulators must have a large form factor that results in a large footprint on the photonics chip. During operation, MZI modulators also tend to consume large amounts of power. Hence, MZI modulators may adversely impact both the layout area and the operational overhead of a photonics chip.

Improved structures for a polarization switch and methods of fabricating a structure for a polarization switch are needed.

SUMMARY

In an embodiment of the invention, a structure includes a waveguide core on a substrate. An active layer is positioned proximate to a section of the waveguide core. The waveguide core is composed of silicon nitride. The active layer is composed of a phase change material having a first state with a first refractive index and a second state with a second refractive index.

In an embodiment of the invention, a method includes forming a waveguide core on a substrate, and forming an active layer positioned proximate to a section of the waveguide core. The waveguide core is composed of silicon nitride, and the active layer is composed of a phase change material having a first state with a first refractive index and a second state with a second refractive index.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
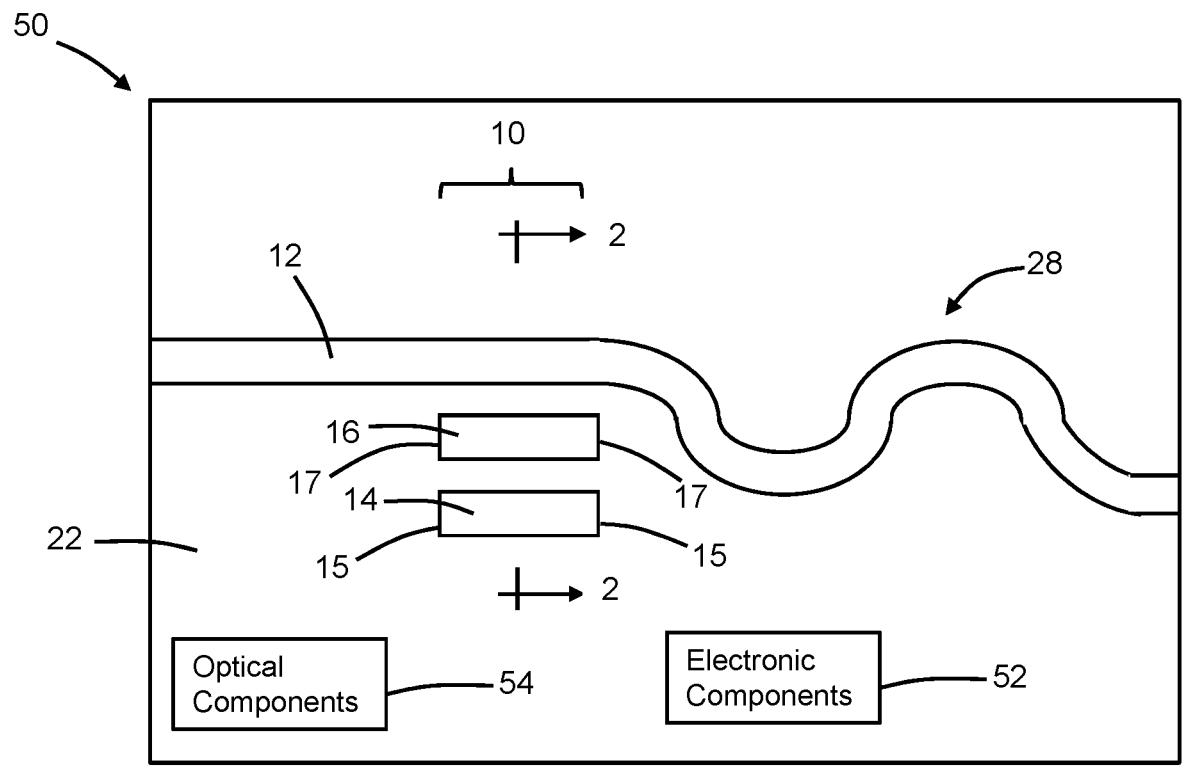
FIG. 1 is a diagrammatic top view of a structure at an initial fabrication stage of a processing method in accordance with embodiments of the invention.
Figure 2:
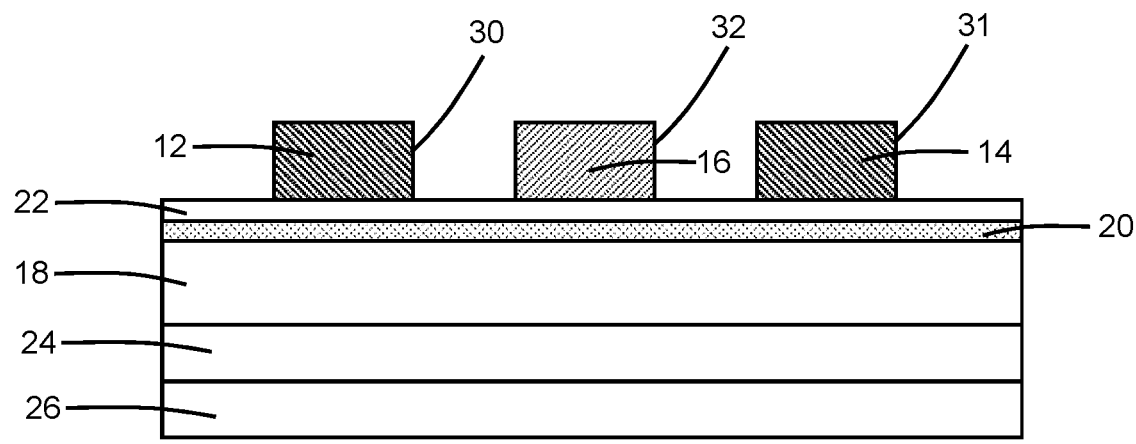
FIG. 2 is a cross-sectional view of the structure taken generally along line 2-2 in FIG. 1.

With reference to FIGS. 1, 2 and in accordance with embodiments of the invention, a structure 10 for a polarization switch includes a waveguide core 12, a waveguide core 14, and an active layer 16 that is laterally positioned between a section of the waveguide core 12 and a section of the waveguide core 14. The waveguide core 12, waveguide core 14, and active layer 16 are arranged over a layer stack that includes multiple dielectric layers 18, 20, 22. The waveguide cores 12, 14, active layer 16, and dielectric layers 18, 20, 22 may be located on a buried insulator layer 24 in a region of a silicon-on-insulator (SOI) wafer from which the device layer has been patterned and removed. The SOI wafer further includes a substrate 26, such as a silicon substrate, that provides mechanical support.

The waveguide cores 12, 14 may be formed from a layer of a dielectric material, such as silicon nitride, that is deposited and patterned by lithography and etching processes. The dielectric layer 18 may be composed of a dielectric material, such as silicon dioxide, deposited by chemical vapor deposition or atomic layer deposition over the buried insulator layer 24. The dielectric layer 20 may be composed of a dielectric material, such as silicon nitride, deposited by chemical vapor deposition or atomic layer deposition over the dielectric layer 18. The dielectric layer 22 may be composed of a dielectric material, such as silicon dioxide, deposited by chemical vapor deposition or atomic layer deposition over the dielectric layer 20.

The active layer 16 may be composed of a material having a temperature-dependent index of refraction (i.e., refractive index) that is deposited and patterned with lithography and etching processes. In an embodiment, the active layer 16 may be composed of a phase change material characterized by an index of refraction that reversibly varies among discrete states characterized by significantly different refractive indices. For example, the phase change material may have a state that exhibits low light absorption when its temperature is below a transition temperature, and the phase change material may have another state that exhibits high light absorption when its temperature is above the transition temperature. The state change of the phase change material may be precipitated by small temperature changes about (i.e., above and below) the transition temperature. In an embodiment, the phase change material may exhibit a reversible phase transition between a metal state and an insulator state at a given transition temperature. In an embodiment, the phase change material may be in an insulating state with low light absorption when its temperature is below a transition temperature, and the phase change material may be placed in a metallic state with high light absorption when its temperature is above the transition temperature. In an embodiment, the phase change material may be characterized by a low imaginary part of its refractive index when its temperature is below a transition temperature, and the phase change material may be characterized by a high imaginary part of its refractive index when its temperature is above the transition temperature. In an embodiment, the active layer 16 may be composed of vanadium oxide.

The output from the waveguide cores 12, 14 and active layer 16 is provided to a passive filter 28. The passive filter 28 may be configured to allow light of one mode (e.g., the transverse electric mode) to pass through and to block the passage of light of another mode (e.g., the transverse magnetic mode). The passive filter 28 may include cascaded bends composed of silicon nitride or another type of structure or mechanism. The passive filter 28, which does not include the phase change material, may be formed concurrently with the formation of the waveguide cores 12, 14.

The active layer 16 is laterally positioned between a section of the waveguide core 12 and a section of the waveguide core 14. In particular, the active layer 16 has opposite side surfaces 32, a bottom surface in contact with layer 22, and a top surface opposite the bottom surface. The waveguide core 12 has opposite side surfaces 30, a bottom surface in contact with layer 22, and a top surface opposite the bottom surface. The waveguide core 14 has opposite side surfaces 31, a bottom surface in contact with layer 22, and a top surface opposite the bottom surface. One of the side surfaces 32 of the active layer 16 is adjacent to (i.e., juxtaposed with) one of the side surfaces 30 of the waveguide core 12, and the other of the side surfaces 32 of the active layer 16 is adjacent to one of the side surfaces 31 of the waveguide core 14. The section of the waveguide core 12, the section of the waveguide core 14, and the active layer 16 may have a planar arrangement in which at least the respective bottom surfaces are coplanar and, in an embodiment, both the respective top surfaces and the respective bottom surfaces are coplanar.

The active layer 16 extends longitudinally between opposite terminating ends 17. In an embodiment, the section of the waveguide core 12 may represent only a portion of its total length, whereas the section of the waveguide core 14 may have a length between opposite terminating ends 15 that is approximately equal to the length of the active layer 16 between its opposite terminating ends 17. The terminating ends 15 may be located proximate to the active layer 16 and, in an embodiment, the terminating ends 15 may be adjacent to the terminating ends 17 of the active layer 16 such that the active layer 16 and the section of the waveguide core 14 have equal or approximately equal lengths.

The active layer 16 is spaced apart from the waveguide core 12 in a non-contacting relationship, and the active layer 16 is also spaced apart from the waveguide core 14 in a non-contacting relationship. The waveguide core 12, waveguide core 14, and active layer 16 may each extend symmetrically along a respective longitudinal axis and may be aligned parallel or substantially parallel to each other. The waveguide cores 12, 14 may be placed equidistant from the active layer 16. The waveguide cores 12, 14 and the active layer 16 may have a constant width over the sections of their length associated with the polarization switch such that the gap between the section of the waveguide core 12 and the active layer 16 is dimensionally constant and the gap between the section of the waveguide core 14 and the active layer 16 is dimensionally constant. In an embodiment, the waveguide cores 12, 14 and the active layer 16 may have equal or substantially equal thicknesses to provide a planar or substantially planar arrangement for the upper and lower surfaces.

Figure 3:
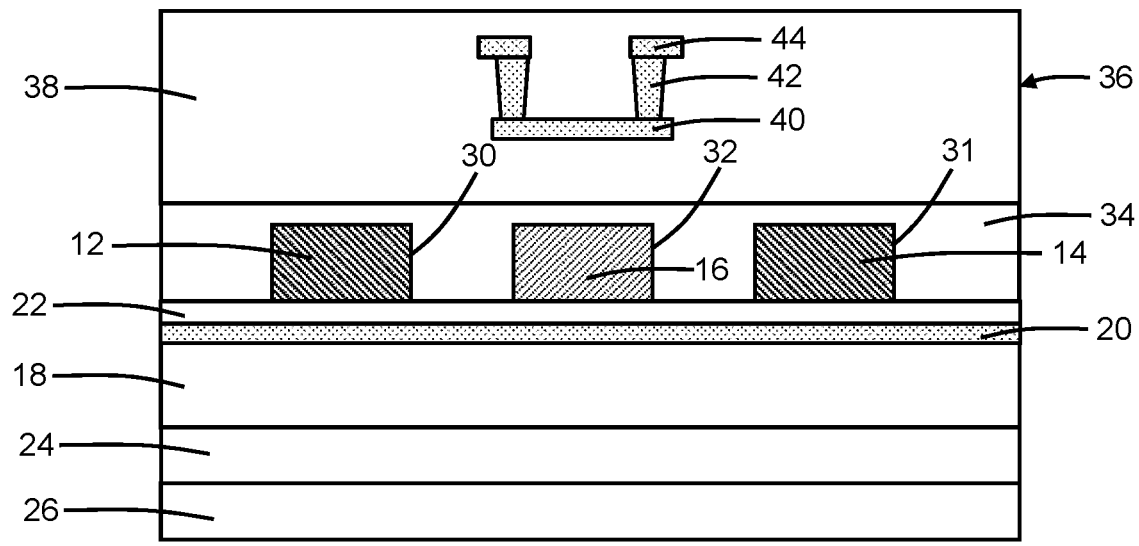
FIG. 3 is a cross-sectional view of the structure at a fabrication stage subsequent to FIG. 2.

With reference to FIG. 3 in which like reference numerals refer to like features in FIG. 2 and at a subsequent fabrication stage, a dielectric layer 34 composed of a dielectric material, such as silicon dioxide, is deposited by chemical vapor deposition and planarized with, for example, chemical mechanical polishing to remove topography. The waveguide cores 12, 14, active layer 16, and passive filter 28 are embedded or buried in the dielectric material of the dielectric layer 34. A portion of the dielectric layer 34 is located in the gap between the active layer 16 and the waveguide core 12, and another portion of the dielectric layer 34 is located in the gap between the active layer 16 and the waveguide core 14.

A back-end-of-line stack, generally indicated by reference numeral 36, is formed by back-end-of-line (BEOL) processing as an interconnect structure over the dielectric layer 34. The back-end-of-line stack 36 may include one or more interlayer dielectric layers 38 composed of one or more dielectric materials, such as a carbon-doped silicon dioxide, and metallization composed of, for example, copper, tungsten, and/or cobalt that is arranged in the one or more interlayer dielectric layers 38.

The back-end-of-line stack 36 may include a thin film resistor 40 that is formed in the back-end-of-line stack 36 proximate to the active layer 16 and that may be connected by contacts 42 with wiring 44 in the back-end-of-line stack 36. The thin film resistor 40 provides a resistance heater that responds to an applied current with Joule heating. The thin film resistor 40 may be composed of a material, such as nickel-chromium, tantalum nitride, or titanium nitride, that is characterized by a sufficient resistance to provide the desired Joule heating. Heat from the thin film resistor 40 may be used to change the temperature of the active layer 16.

The structure 10, in any of its embodiments described herein, may be integrated into a photonics chip 50 (FIG. 1) that includes electronic components 52 and additional optical components 54. For example, the electronic components 52 may include field-effect transistors that are fabricated using the device layer by CMOS front-end-of-line (FEOL) processing.

The index of refraction of the active layer 16 may be tuned as a function of the temperature of the active layer 16. To that end, a current may be applied to the thin film resistor 40 to produce heat by Joule heating. The heat is transferred by thermal conduction through the back-end-of-line stack 36 to the active layer 16. The arriving heat is absorbed by the active layer 16 and causes the temperature of the active layer 16 to increase as a function of the flux of heat received from the thin film resistor 40. If the flux of heat is discontinued, the active layer 16 cools. In an alternative embodiment, the heating of the active layer 16 may be produced by directing a laser to impinge the active layer 16.

In use, laser light propagating as an optical signal in the waveguide core 12 may enter the structure 10. The laser light may propagate with a transverse electric (TE) mode component and a transverse magnetic (TM) mode component. The structure 10 may be switched between 'ON' and 'OFF' conditions or states by selectively applying heat to the active layer 16 to cause the temperature of the active layer 16 to vary relative to a transition temperature. In one state (e.g., the 'OFF' condition) in which the temperature of the active layer 16 is less than the transition temperature, the TE mode and the TM mode of the laser light may be transmitted through the structure 10 to the passive filter 28. The passive filter 28 removes (i.e., filters) the TM mode component and transmits the TE mode component as output. In another state (e.g., the 'ON' condition) in which the temperature of the active layer 16 is greater than the transition temperature, only the TM mode of the laser light may be transmitted through the structure 10 to the passive filter 28. The passive filter 28 filters the TM mode component such that the laser light is absorbed and not output from the passive filter 28. Through the selective application of heat, an optical signal containing both TM and TE mode components that is received at the entrance to the structure 10 can be modulated such that the passive filter 28 can provide additional modulation.

The structure 10 provides a compact polarization switch with the ability to convert an unpolarized input beam into a switched output beam in which the polarized light output from the structure 10 is switched on and off. The structure 10 may exhibit a high extinction ratio with a moderate insertion loss.

Forming the waveguide cores 12, 14 from silicon nitride may be beneficial in comparison with silicon waveguide cores. For example, waveguide cores 12, 14 formed from silicon nitride improve the power handling capability of the structure 10 in comparison with silicon waveguide cores. Waveguide cores 12, 14 formed from silicon nitride exhibit greater thermal stability than silicon waveguide cores, which may reduce the influence of thermal tuning of the active layer 16 on the guided laser light. Waveguide cores 12, 14 formed from silicon nitride are more tolerant to fabrication imperfections in comparison with silicon waveguide cores. The refractive index of silicon nitride is closer to the refractive index of vanadium oxide in its high refractive index state than to the refractive index of silicon, which may enhance the coupling and interaction of the filtered mode component in the structure 10.

Figure 4:
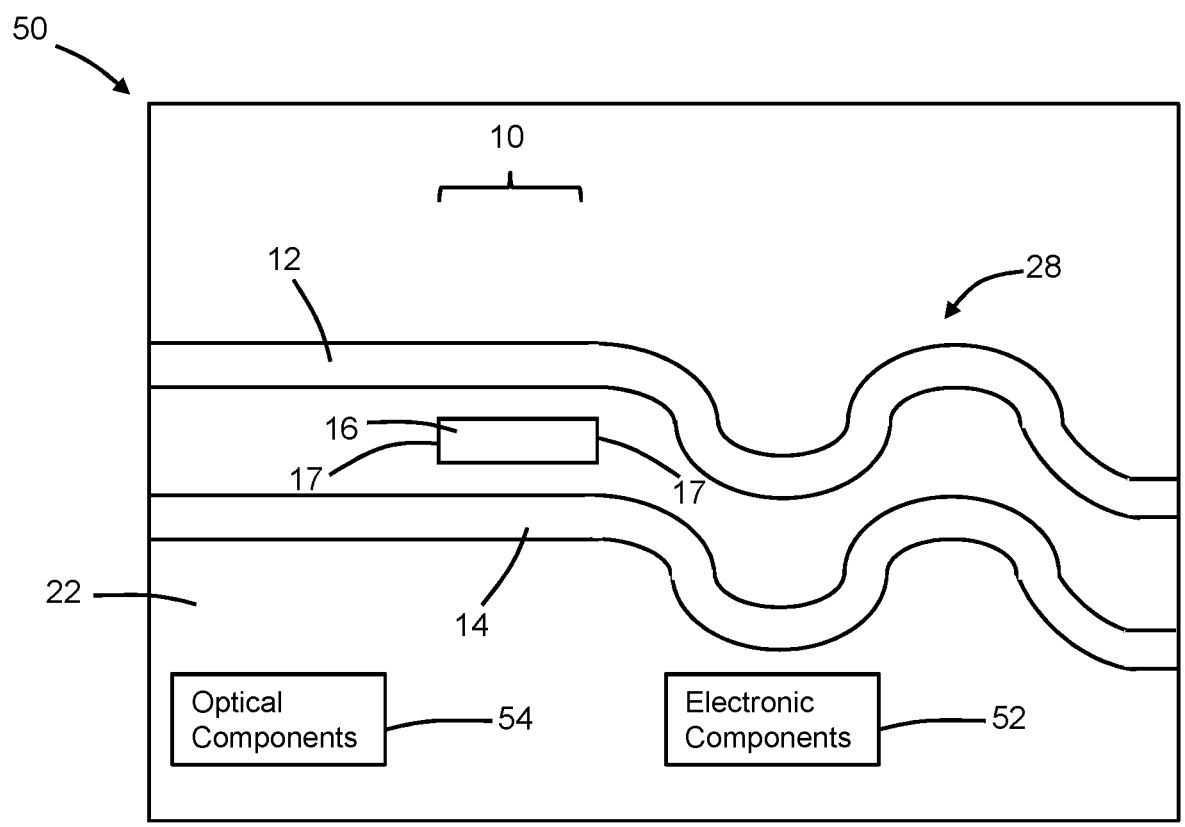
FIGS. 4 and 5 are top views of structures in accordance with alternative embodiments of the invention.

With reference to FIG. 4 in which like reference numerals refer to like features in FIG. 1 and in accordance with alternative embodiments of the invention, the waveguide core 14 may extend in length parallel to the waveguide core 12 to define a slotted waveguide that guides the laser light. The waveguide core 14 lacks terminating ends 15 proximate to the active layer 16. Instead, a section of the waveguide core 14 proximate and adjacent to the active layer 16 participates in the structure 10. In an alternative embodiment, the waveguide core 14 may be omitted from the structure 10 such that only the section of the waveguide core 12 proximate and adjacent to the active layer 16 participates in the structure 10.

Figure 5:
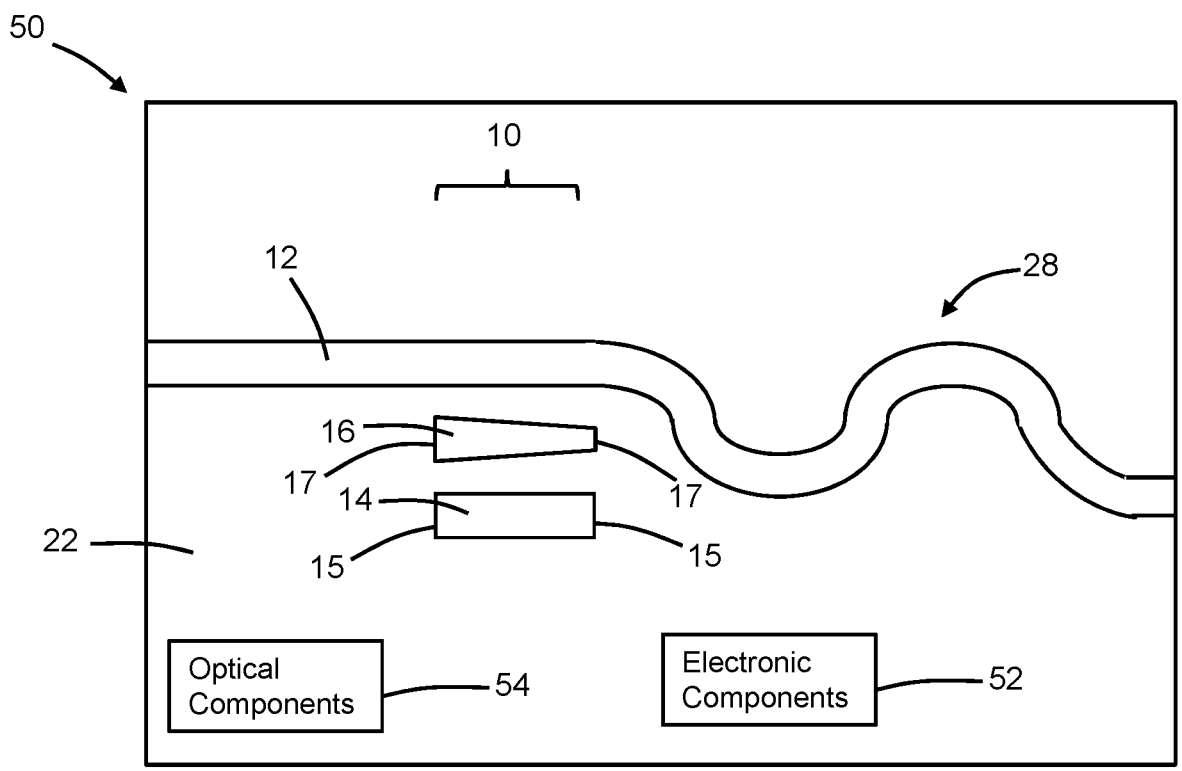

With reference to FIG. 5 in which like reference numerals refer to like features in FIG. 1 and in accordance with alternative embodiments of the invention, the active layer 16 may be tapered with a smaller width at the entrance to the structure 10 in order to reduce the insertion loss. The tapering of the active layer 16 introduces a varying-dimension gap between the active layer 16 and the waveguide core 12, and a varying-dimension gap between the active layer 16 and the waveguide core 14.

Figure 6:
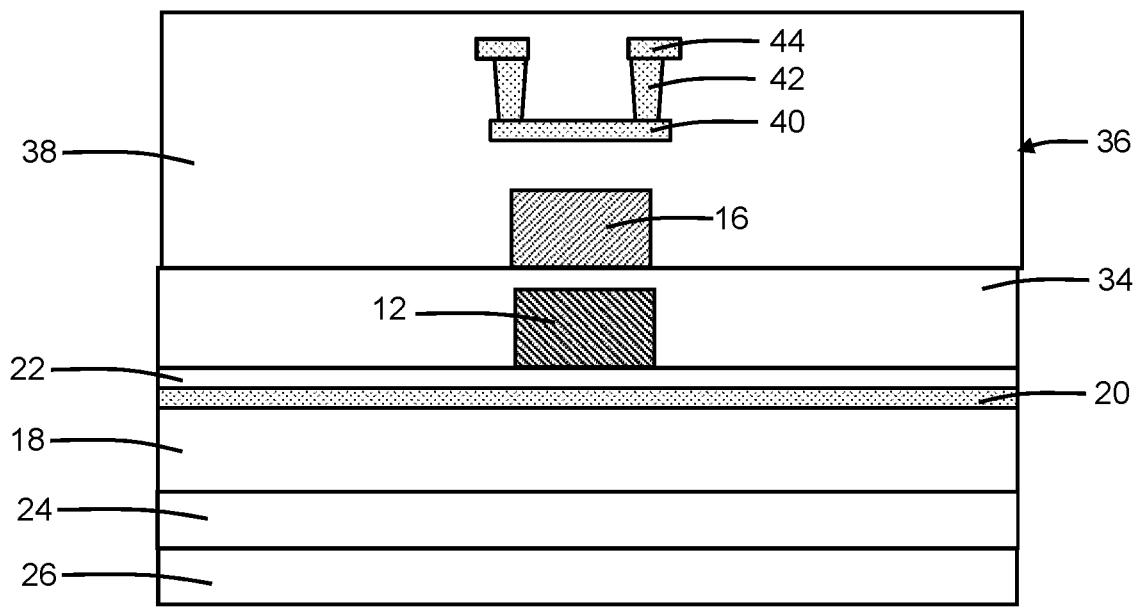
FIG. 6 is a cross-sectional view of a structure in accordance with alternative embodiments of the invention.

With reference to FIG. 6 in which like reference numerals refer to like features in FIG. 3 and in accordance with alternative embodiments of the invention, the active layer 16 may be arranged over the waveguide core 12. The section of the waveguide core 12 proximate to active layer 16 participates in the structure 10 and has a non-contacting with the active layer 16. Due to the rearrangement of parts, only the TE mode of the propagating laser light may be transmitted through the structure 10 to the passive filter 28 when the polarization switch in in its "ON" state. The passive filter 28 receives laser light with both TE and TM mode components when the polarization switch in in its "OFF" state and transmits the TM mode component, and the passive filter 28 only receives laser light with the TE mode component when the polarization switch in in its "ON" state, which is absorbed and not output from the passive filter 28.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A structure comprising:
a substrate;
a waveguide core on the substrate, the waveguide core comprising silicon nitride; and
an active layer positioned proximate to a section of the first waveguide core, the active layer comprised of a phase change material having a first state with a first refractive index and a second state with a second refractive index,
wherein the active layer and the waveguide core have a non-contacting relationship.
2. The structure of claim 1 further comprising:
a dielectric layer including a portion positioned between the active layer and the waveguide core.

3. The structure of claim 1 wherein the active layer is positioned on the substrate laterally adjacent to the section of the waveguide core.

4. The structure of claim 1 wherein the section of the waveguide core is positioned between the active layer and the substrate.

5. The structure of claim 1 further comprising:
a heater positioned proximate to the active layer, the heater configured to generate heat transferred to the phase change material of the active layer to provide the first state and the second state.

6. The structure of claim 5 further comprising:
a back-end-of-line stack over the section of the waveguide core and the active layer,
wherein the heater is located in the back-end-of-line stack.

7. The structure of claim 6 wherein the heater is a thin film resistor.

8. The structure of claim 1 further comprising:
a passive filter on the substrate, the passive filter coupled to the first waveguide core.

9. The structure of claim 1 wherein the phase change material is vanadium oxide.

10. A structure comprising:
a substrate;
a waveguide core on the substrate, the waveguide core comprising silicon nitride; and
an active layer positioned proximate to a section of the waveguide core, the active layer comprised of a phase change material having a first state with a first refractive index and a second state with a second refractive index,
wherein the phase change material is vanadium oxide.

11. The structure of claim 10 further comprising:
a passive filter on the substrate, the passive filter coupled to the waveguide core.

12. The structure of claim 10 further comprising:
a heater positioned proximate to the active layer, the heater configured to generate heat transferred to the phase change material of the active layer to provide the first state and the second state.

13. The structure of claim 12 further comprising:
a back-end-of-line stack over the section of the waveguide core and the active layer, wherein the heater is located in the back-end-of-line stack.

14. A structure comprising:
a substrate;
a first waveguide core on the substrate, the first waveguide core comprising silicon nitride:
a second waveguide core on the substrate; and
an active layer positioned proximate to a section of the first waveguide core, the active layer comprised of a phase change material having a first state with a first refractive index and a second state with a second refractive index,
wherein the second waveguide core includes a section positioned on the substrate proximate to the active layer, and the active layer is positioned on the substrate laterally between the section of the first waveguide core and the section of the second waveguide core.

15. The structure of claim 14 wherein the second waveguide core comprises silicon nitride.

16. The structure of claim 14 wherein the second waveguide core has a first terminating end and a second terminating end each proximate to the active layer.

17. The structure of claim 14 wherein the active layer and the first waveguide core have a first non-contacting relationship, and the active layer and the second waveguide core have a non-second contacting relationship.

18. The structure of claim 17 further comprising:
a dielectric layer having a first portion in a first gap between the active layer and the first waveguide core and a second portion in a second gap between the active layer and the second waveguide core.

19. The structure of claim 14 wherein the phase change material is vanadium oxide.

20. The structure of claim 14 further comprising:
a heater positioned proximate to the active layer, the heater configured to generate heat transferred to the phase change material of the active layer to provide the first state and the second state.

21. The structure of claim 20 further comprising:
a back-end-of-line stack over the section of the first waveguide core, the section of the second waveguide core, and the active layer, wherein the heater is located in the back-end-of-line stack.

* * * * *